United States Patent

Arai

[11] Patent Number: 5,448,487
[45] Date of Patent: Sep. 5, 1995

[54] VEHICLE NAVIGATION CONTROL SYSTEM

[75] Inventor: Kazumasa Arai, Oota, Japan

[73] Assignee: Fuji Jukogyo Kabushiki Kaisha, Tokyo, Japan

[21] Appl. No.: 224,713

[22] Filed: Apr. 8, 1994

[30] Foreign Application Priority Data

Apr. 15, 1993 [JP] Japan .................. 5-088916

[51] Int. Cl.[6] .............................. G01C 21/10
[52] U.S. Cl. .................. 364/449; 364/424.02; 364/444
[58] Field of Search .............. 364/449, 424.02, 424.01, 364/444, 424.05, 434; 340/995, 996, 988

[56] References Cited

U.S. PATENT DOCUMENTS

| | | | |
|---|---|---|---|
| 4,530,057 | 7/1985 | Ahlbom | 364/424 |
| 4,566,032 | 1/1986 | Hirooka et al. | 358/103 |
| 4,970,653 | 11/1990 | Kenue | 364/461 |
| 5,155,683 | 10/1992 | Rahim | 364/424.02 |
| 5,208,750 | 5/1993 | Kurami et al. | 364/424.02 |
| 5,229,941 | 7/1993 | Hattori | 364/424.02 |
| 5,301,115 | 4/1994 | Nouso | 364/460 |
| 5,307,136 | 4/1994 | Saneyoshi | 356/1 |
| 5,307,419 | 4/1994 | Tsujino et al. | 382/1 |

OTHER PUBLICATIONS

"Automobiles and Ergonomics Topic 2," vol. 25, No. 10, 1971, pp. 1058–1064 (in Japanese—Translation not provided).
"Directional Control on the Curved Road Using a DOyble-Point Aiming Model" Kazumasa Arsi, et al. SAE Japan, JSAE Review 15 (1994) 177–182.

*Primary Examiner*—Gary Chin
*Assistant Examiner*—Stephen J. Walder, Jr.
*Attorney, Agent, or Firm*—Beveridge, DeGrandi, Weilacher & Young

[57] ABSTRACT

A vehicle navigation control system has primary prediction error width calculating means for calculating a primary near-distance error width between a forward extending line of the vehicle and a target path at a predetermined near-distance observing location and for calculating a primary far-distance error width between the forward extending line and the target path at a predetermined far-distance observing location. A secondary near-distance error width between a predicted path and the target path at the predetermined near-distance observing location, and a secondary far-distance error width between the predicted path and the target path at the predetermined far-distance observing location, are calculated by a secondary prediction error width calculation means. Steering angle calculating formula selecting means determines whether the target path is a straight path or a curved path with a large curvature, a constantly curved path, or other curved path in accordance with the error widths calculated by the primary and secondary prediction error width calculating means and selects an optimum formula from predetermined model formulas. Steering angle determining means substitutes the corresponding error widths into the selected model formula so as to determine a steering angle.

6 Claims, 6 Drawing Sheets

VEHICLE NAVIGATION CONTROL SYSTEM

BACKGROUND OF THE INVENTION

1. Field of the Invention

The present invention relates to a vehicle navigation control system for navigating a vehicle along a path so as to assist a driving operation of a driver.

2. Description of the Related Art

In recent years, the steering operations of drivers and operable stabilities of vehicles are becoming important matters from a safety point of view. Technologies that allow drivers to be free from tedious driving operations and vehicles to automatically run are being developed.

A navigation control is a basic technology for allowing vehicles to run on a designated path safely and correctly.

Generally, except for undulations, paths for vehicles consist of curved lines and straight lines. To cause a vehicle to follow a curved path, a steering angle corresponding to the curvature of the curved path should be given position by position.

The following vehicle navigation models for navigating the vehicle corresponding to the curved path are known.

1) Programmed steering model

A predetermined steering pattern is selected corresponding to steering characteristics of the vehicle and pattern recognition of a forward course. After the vehicle enters the curved path, the steering angle of the vehicle is controlled corresponding to the selected steering pattern.

2) Forward error compensation model with primary prediction.

As shown in FIG. 7A, steering angle $\delta$ is given by multiplying error width d of extended line 0 of vehicle 1 against a target path at a predetermined forward location by a predetermined proportional constant (gain) k (namely, $\delta = k \times d$).

3) Forward error compensation model with secondary prediction.

A forward location of the vehicle is predicted with present location, direction, and running conditions. The predicted location is compared with a target path. The vehicle is navigated so that the difference between the predicted location and the target path becomes zero. As shown in FIG. 7B, the error width $\epsilon$ for a predetermined forward observing distance is integrated and the resultant value is multiplied by the proportional constant k. The result is the steering angle $\delta$ (namely, $\delta = k \Sigma \epsilon$).

These simulations are described in for example Automobile Technologies, "Automobiles and Ergonomics Topic 2", Vol. 25, No. 10, 1971, pp 1058-1064.

However, in the programmed steering model, since many of shapes should be considered for paths, optimum navigation characteristics cannot be obtained. Thus, the number of programming steps becomes huge. In addition, as the shape of a path largely varies, the response delay becomes large.

In the forward error compensation model with primary prediction, navigation control characteristics for nearly straight paths are satisfactory. However, if the vehicle runs on the curved path with a small curvature, a gain (proportional constant) corresponding to the curvature would be required so as to precisely navigate the vehicle on the path.

In the forward error compensation model with the secondary prediction, even if the curvature of the path varied, if a predetermined gain (proportional constant) was given, satisfactory navigation characteristics could be obtained. However, since error width $\epsilon$ was integrated, if the vehicle runs on the path with a large curvature (namely, on an almost straight path), the speed of the vehicle increases. Thus, the navigation control becomes unstable. In addition, if the predetermined forward distance is far from the vehicle on the path where the curvature largely varies position by position (namely, on an S-shaped path), the curvature of the path on which the vehicle runs would largely differ from the curvature of the target path. Thus, the vehicle would be out of the path.

The present invention is made from the above-mentioned point of view.

SUMMARY OF THE INVENTION

A primary object of the present invention is to provide a vehicle navigation control system with high navigation characteristics corresponding to any change of any path.

The present invention is directed at a vehicle navigation control system for determining a steering angle of a vehicle, comprising primary prediction error width calculating means for calculating a primary near-distance error width between a forward extending line of the vehicle and a target path at a predetermined near-distance observing location in a running direction of the vehicle and a primary far-distance error width between the forward extending line and the target path at a predetermined far-distance observing location, secondary prediction error width calculating means for calculating a secondary near-distance error width between a predicted path and the target path at the predetermined near-distance observing location in the running direction of the vehicle and a secondary far-distance error width between the predicted path and the target path at the predetermined far-distance observing location, steering angle calculating formula selecting means for determining whether the target path is a straight path or a curved path with a large curvature, a constantly curved path, or other curved path in accordance with the error widths calculated by the primary and secondary prediction error width calculating means and for selecting an optimum formula from predetermined model formulas; and steering angle determining means for substituting the corresponding error width into the selected model formula so as to determine the steering angle.

According to the present invention, the primary predication error width calculating means calculates an error width between a forward extending line of a vehicle and a target path at a predetermined near-distance observing location in the vehicle running direction- In addition, the primary predication error width calculating means calculates an error width between the forward extending line of a vehicle and the target path at a predetermined far-distance observing location.

The secondary prediction error width calculating means calculates an error width between a predicted path and the target path at a predetermined near-distance observing location in a vehicle running direction. In addition, the secondary prediction error width calculating means calculates an error width between the predicted path and the target path at a predetermined far-distance observing location.

The steering angle calculating formula selecting means determines whether the path is a straight path or a curved path with a large curvature, a constant curved path, or other curved path in accordance with the error widths calculated by both the primary and secondary predication error width calculating means and selects an optimum one from predetermined model formulas for setting a steering angle.

The steering angle determining means selects an error width corresponding to the selected model formula and substitutes the selected error width into the model formula.

According to the present invention, since an optimum formula from the predetermined model formulas for setting a steering angle is selected corresponding to any change of any path, the vehicle can be accurately navigated corresponding to any change of any path.

These and other objects, features and advantages of the present invention will become understood referring to the following detailed description and the accompanying drawings.

DESCRIPTION OF PREFERRED EMBODIMENT

A preferred embodiment of the present invention will become understood from the following detailed description referring to the accompanying drawings.

Figure 1:
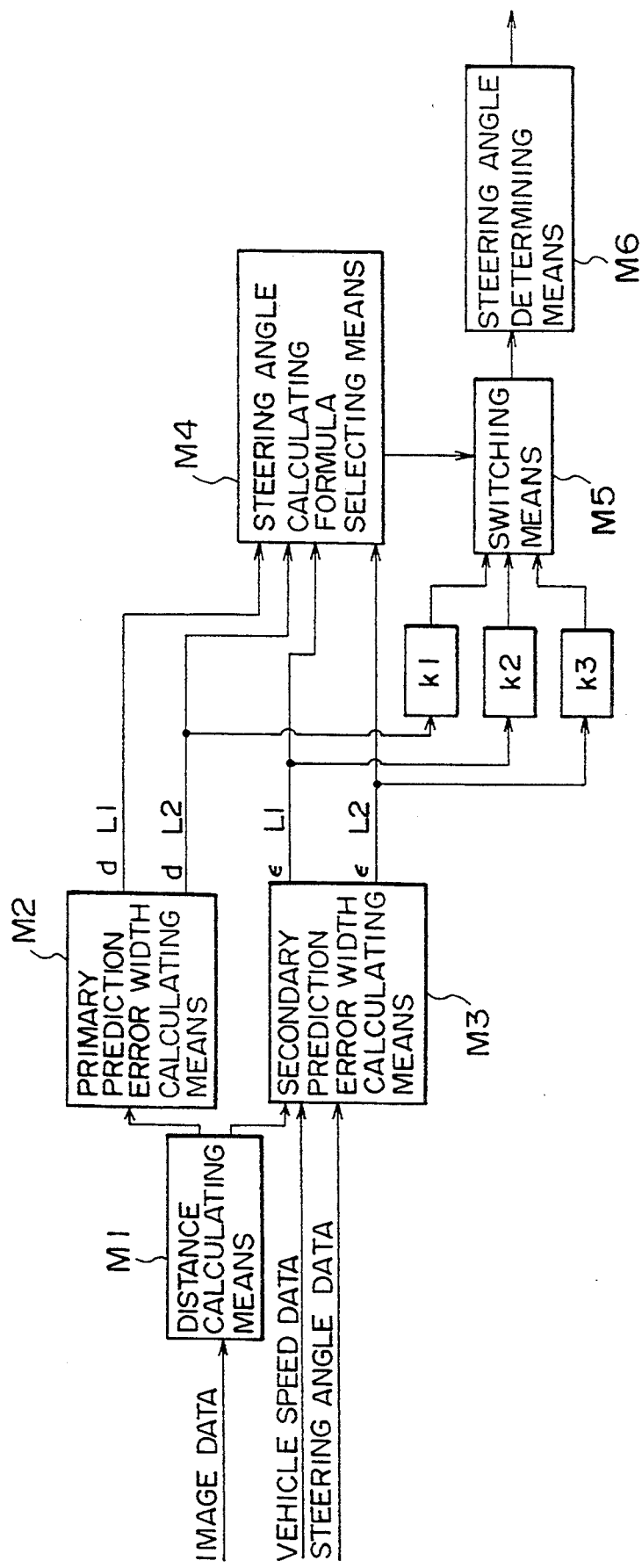
FIG. 1 is a functional block diagram showing a control system.
Figure 2:
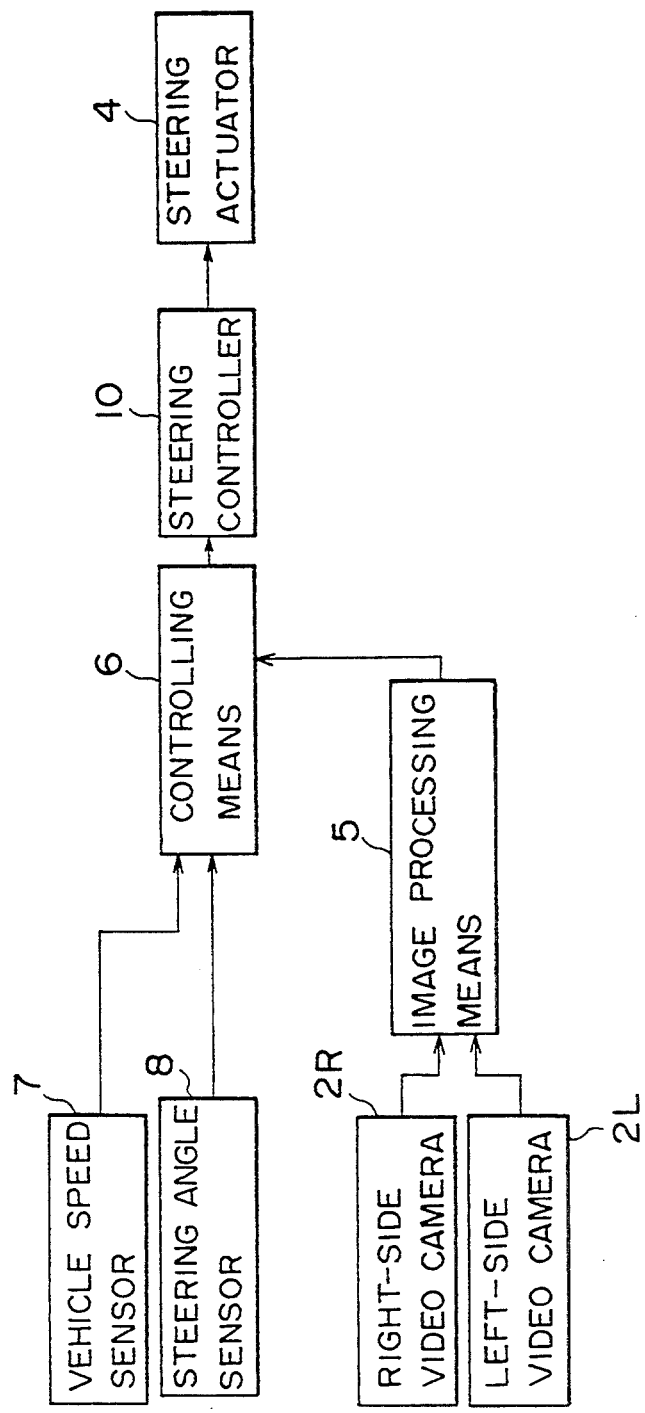
FIG. 2 is a block diagram showing a vehicle navigation control system.
Figure 3:
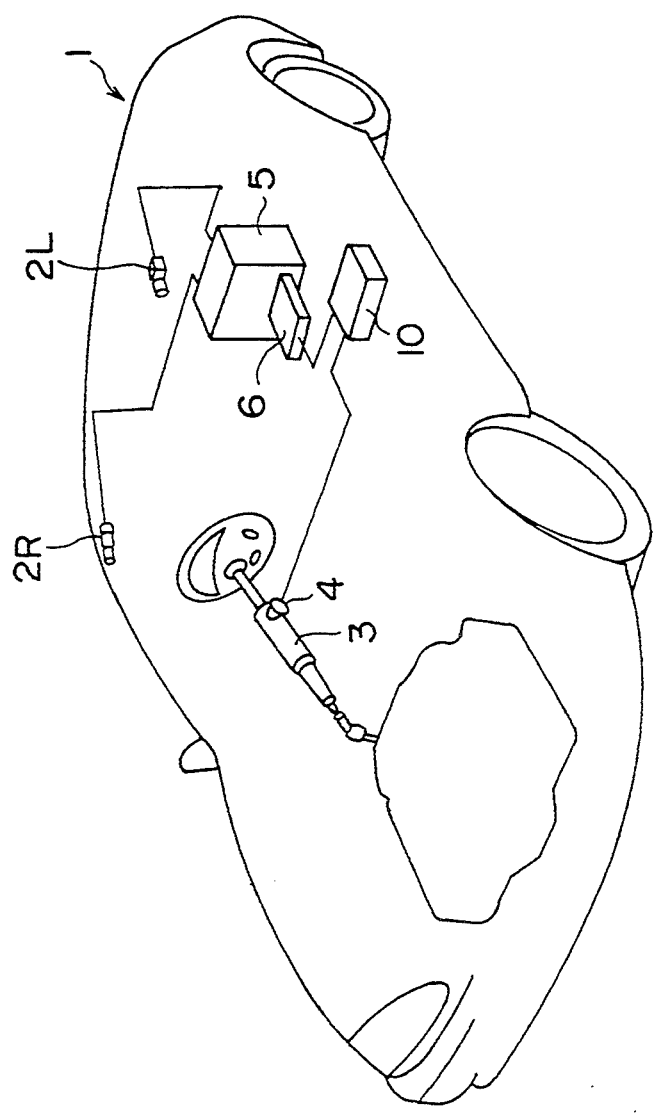
FIG. 3 is a perspective view showing a construction of the navigation controlling apparatus installed in a vehicle.
Figure 4:
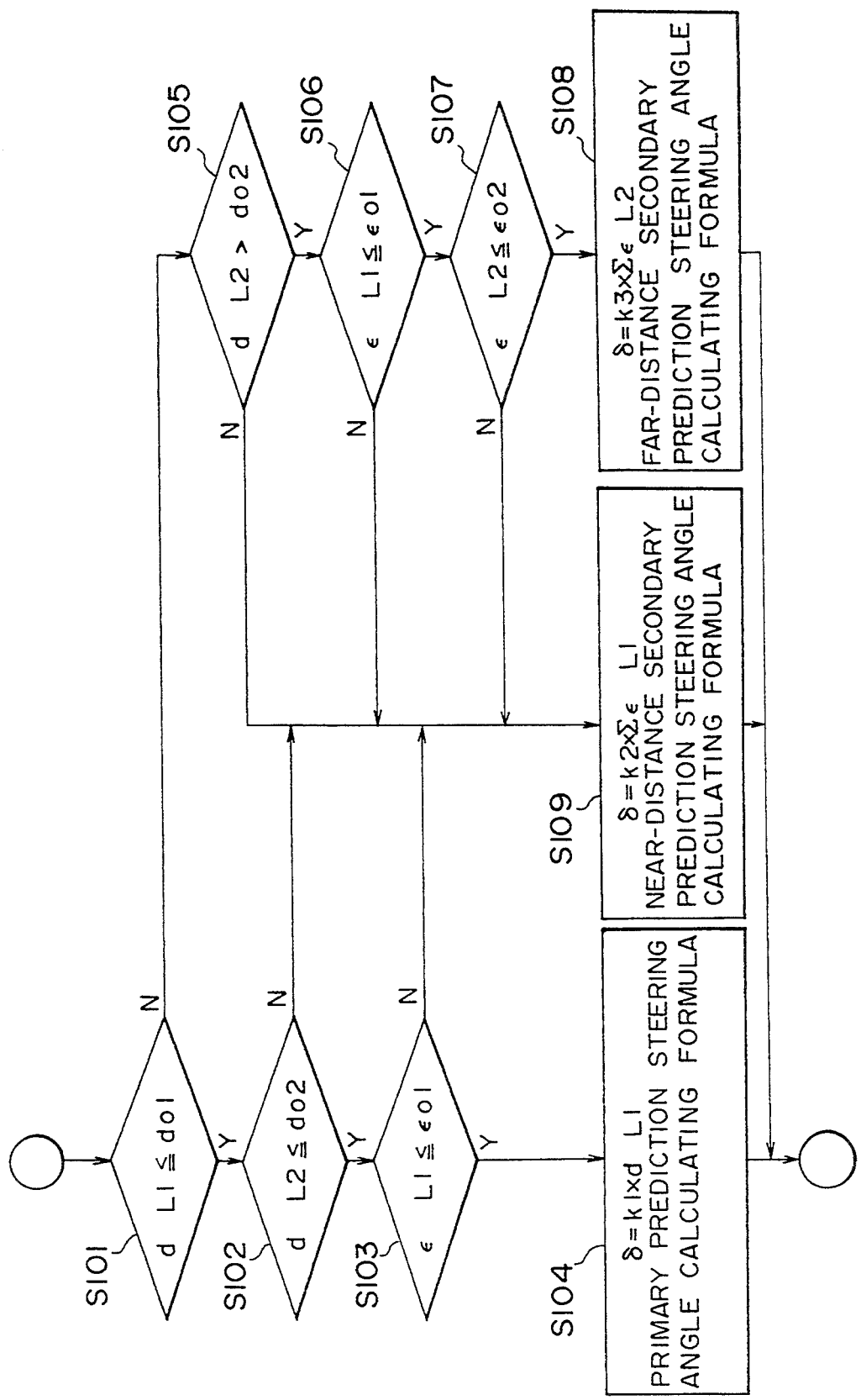
FIG. 4 is a flow chart showing a steering angle calculating formula selecting process.
Figure 5:
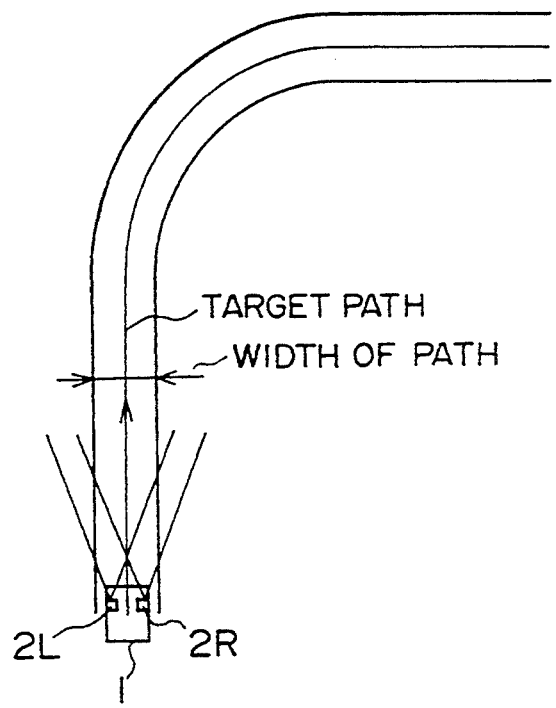
FIG. 5 is a schematic diagram showing a navigated condition of a vehicle.
Figure 6:
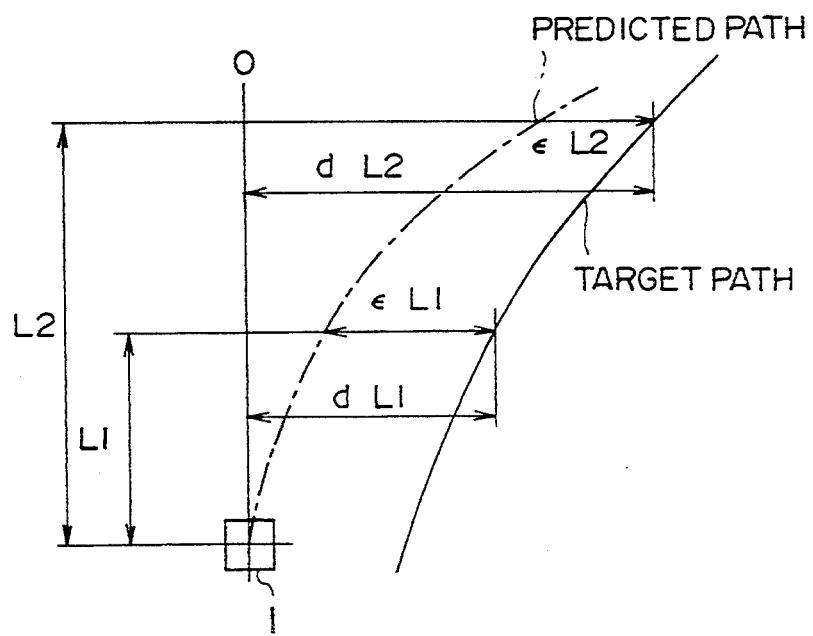
FIG. 6 is a schematic diagram showing a conception of navigation control.
Figures 7A, 7B:
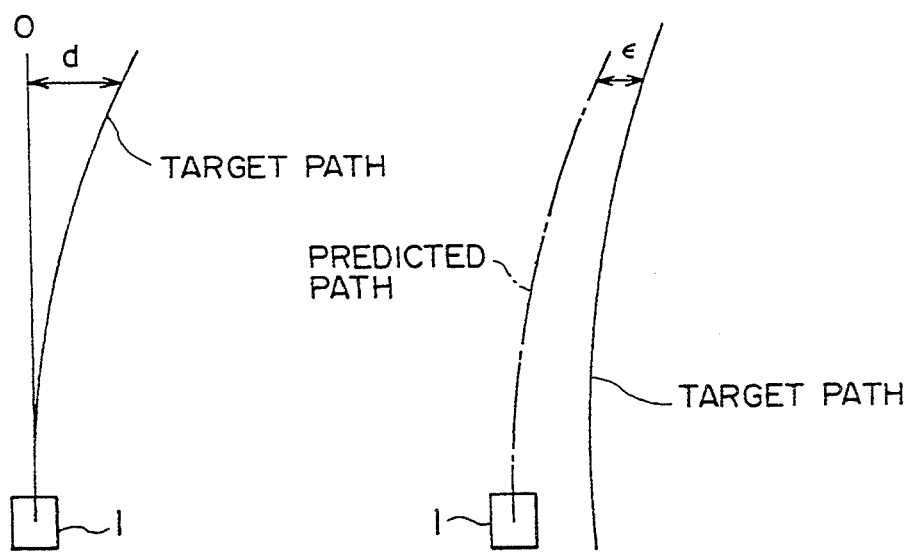
FIGS. 7A and 7B are schematic diagrams showing a conception of a conventional navigation control.

FIGS. 1 to 6 show an embodiment of the present invention. FIG. 1 is a functional block diagram showing a controlling means. FIG. 2 is a block diagram showing vehicle navigation control system. FIG. 3 is a perspective view showing the navigation control system installed in a vehicle. FIG. 4 is a flow chart showing a steering angle calculating formula selecting process. FIG. 5 is a schematic diagram showing a navigated condition of a vehicle. FIG. 6 is a schematic diagram showing a conception of navigation control.

The navigation control system is installed in a vehicle 1 such as an automobile. The navigation control system comprises video cameras 2R and 2L, a steering actuator 4, an image processing means 5, controlling means 6, and a steering controller 10. The video cameras 2R and 2L are disposed on an upper right position and an upper left position of the vehicle 1, respectively. The video cameras 2R and 2L are spaced by a predetermined distance and oriented in forward direction of the vehicle 1. The steering actuator 4 is secured to a steering column 3 and controls a steering angle of front wheels through a steering shaft (not shown). The image processing means 5 processes image signals received from the video cameras 2R and 2L. The controlling means 6 sets a steering angle in accordance with the image data, vehicle speed data detected by a vehicle speed sensor 7 and a steering angle sensor 8, steering angle data, and so forth. The steering controller 10 outputs a drive signal in accordance with the steering angle, which is set by the controlling means 6, to the steering actuator 4.

With solid-state imaging devices such as CCDs (Charge Coupled Devices), the video cameras 2R and 2L photograph predetermined forward portions of the vehicle 1 as denoted by thin lines of FIG. 5.

The image processing means 5 processes image signals received from the video cameras 2R and 2L and selects an image to be recognized (such as a white line representing the width of a path and an object to be measured) in accordance with luminance of the image, chrome saturation, density, and so forth.

The controlling means 6 comprises distance calculating means M1, primary predication error width calculating means M2, secondary prediction error width calculating means M3, steering angle calculating formula selecting means M4, switching means M5, and steering angle determining means M6.

The distance calculating means M1 calculates a predetermined near-distance observing location L1, a predetermined far-distance observing location L2, and a path on which the vehicle 1 will run (this path is referred to as the target path) in accordance with image data received from the image processing means 5. The target path can be obtained by recognizing the width of a path with, for example, a white line in which the vehicle 1 is running, and calculating the center of the width of the path (see FIG. 5).

The primary prediction error width calculating means M2 calculates an error width d L1 between an extending line 0 from the center of the vehicle 1 and the target path at the near-distance location L1. In addition, the primary prediction error width calculating means M2 calculates an error width d L2 between the extending line 0 from the center of the vehicle 1 and the target path at the far-distance location L2 (see FIG. 6).

The secondary predication error width calculating means M3 calculates a predicted path in accordance with a present location, a direction, a running condition, and so forth of the vehicle 1, which are calculated in accordance with the steering data, the vehicle speed data, and so forth. The secondary prediction error width calculating means M3 calculates an error width $\epsilon L1$ between the predicted path and the target path at the near-distance location L1. In addition, the secondary predication error width calculating means M3 calculates an error width $\epsilon L2$ between the predicted path and the target path at the far-distance location L2 (see FIG. 6).

The steering angle calculating formula selecting means M4 selects an optimum formulae of predetermined steering angle calculating formulas in accordance with the error widths d L1, d L2, $\epsilon L1$, and $\epsilon L2$.

In this embodiment, there are three model formulas which consist of a primary prediction steering angle calculating formula ($\delta = k1 \times d L1$), a near-distance secondary prediction formula ($\delta = k2 \times \Sigma \epsilon L1$), and a far-distance secondary prediction formula ($\delta = K3 \times \Sigma \epsilon L2$). The selecting process for the steering angle calculating formulas will be described later with reference to a flow chart.

The switching means M5 selects one of the proportional constants (gains) k1, k2, or k3 and one of the error widths d L1, $\epsilon L1$, and $\epsilon L2$ corresponding to the steering angle calculating formula selected by the steering angle calculating formula selecting means M4.

The steering angle determining means M6 substitutes the selected proportional constant and the selected error width (k1 and d L1, k2 and $\epsilon$L1, or k3 and $\epsilon$L2) into the selected steering angle calculating formula.

A signal corresponding to the steering angle is output to the steering controller 10.

Next, with reference to a flow chart of FIG. 4, a steering angle calculating formula selecting process will be described.

According to the flow chart, the selected error width (d L1, d L2, $\epsilon$L1, or $\epsilon$L2) is compared with reference values ($d_{01}$, $d_{02}$, $\epsilon_{01}$, or $\epsilon_{02}$), respectively.

When the result at step S101 is d L1$\leq d_{01}$, the result at step S102 is d L2$\leq d_{02}$, and the result at step S103 is $\epsilon$L1 $\leq \epsilon_{01}$, the primary prediction steering angle calculating formula ($\delta = k1 \times$ d L1) is selected at step S104.

When the result at step S101 is d L1$> d_{01}$, the result at step S105 is d L2$> d_{02}$, the result at step S106 is $\epsilon$L1 $\leq \epsilon_{01}$, and the result at step S107 is $\epsilon$L2$\leq \epsilon_{02}$, the far-distance secondary predication steering angle calculating formula ($\delta = k3 \times \Sigma \epsilon$L2) is selected at step S108.

Otherwise, the near-distance secondary prediction steering angle calculating formula ($\delta = k2 \times \Sigma \epsilon$L1) is selected at step S109.

In summary, the steering angle calculating formulas are selected as follows.

(1) Primary predication steering angle calculating formula (d L1$\leq d_{01}$, d L2$\leq d_{02}$, and $\epsilon$L1$\leq \epsilon_{01}$).

The determined target path is a straight path or gradually curved path. With the primary predication steering angle calculating formula, the running characteristics of the vehicle 1 become stable.

(2) Far-distance secondary predication steering angle calculating formula (d L1$> d_{01}$, d L2$> d_{02}$, $\epsilon$L1$\leq \epsilon_{01}$, and $\epsilon$L2$\leq \epsilon_{02}$).

The determined target path is a constantly curved path. With the far-distance secondary predication steering angle calculating formula, a far observing location is set. Thus, the vehicle can be properly navigated on the curved path with proper running characteristics.

(3) Near-distance secondary predication steering angle calculating formula (other than (1) and (2) above).

The determined target path is a curved path with an error width other than (1) and (2). This target path largely varies position by position. That is, the target path varies from a straight path to a curved path or S-shaped path. As the observing point is set to a near location, the running accuracy of the vehicle is improved.

The above-mentioned reference values are obtained from experiments. For example, $d_{01} = 0.25$ (m), $d_{02} = 1.0$ (m), $\epsilon_{01} = 0.05$ (m), and $\epsilon_{02} 0.5$ (m).

In this embodiment, when the vehicle is navigated, the primary predication formula or the secondary predication is selected according to the curvature of the path. In addition, if the secondary prediction formula is selected, an observing point is selected from a near location or a far location. Thus, the navigating characteristics against changes of the paths are improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A navigation control system for a vehicle with the navigation control system having a pair of cameras mounted on said vehicle for taking an image of an outside circumstance and for transmitting an image signal, a vehicle speed sensor mounted on said vehicle for detecting a vehicle speed and for generating a vehicle speed signal, and a steering angle sensor mounted on a steering column in said vehicle for sensing a steering angle and for producing a steering angle signal, said system further comprising:

distance calculating means responsive to said image signal for calculating a running distance from the vehicle and for producing a corresponding distance signal;

primary error width calculating means responsive to a distance signal from said distance calculating means for calculating a primary near-distance error width between a forwardly extending line in front of said vehicle and a target path located in a running direction of said vehicle within a calculated near running distance and for generating a primary near-distance error width signal;

said primary error width calculating means also being responsive to a distance signal from said distance calculating means for calculating a primary far-distance error width between said forwardly extending line in front of said vehicle and said target path located in said running direction of said vehicle within a calculated far running distance and for generating a primary far-distance error width signal;

secondary error width calculating means responsive to said vehicle speed signal, said steering angle signal and a distance signal from said distance calculating means for calculating a predicted path and a secondary near-distance error width between said predicted path and said target path located in said running direction of said vehicle within a calculated near running distance and for generating a secondary near-distance error width signal;

said secondary error width calculating means further being for calculating a secondary far-distance error width between said predicted path and said target path located in said running direction of said vehicle within a far running distance calculated by said distance calculating means and for generating a secondary far-distance error width signal;

steering angle formula selecting means responsive to said primary and secondary near-distance error width signals and said primary and secondary far-distance error width signals for selecting a desired model steering angle formula and for transmitting a select signal; and steering angle determining means responsive to said primary and secondary near-distance error width signals, said primary and secondary far-distance error width signals and said select signal for deciding on an optimum steering angle for accurately and rapidly following said target path.

2. The vehicle navigation control system as set forth in claim 1, wherein said steering angle formula selecting means determines that (a) the target path is a straight path or a curved path with a large curvature if the primary near-distance error width and the primary far-distance error width are equal to or less than predetermined corresponding values, respectively, and if the secondary near-distance error width is equal to or less than a predetermined corresponding value, (b) the target path is a constantly curved path if the primary near-distance error width and the primary far-distance error width are equal to or more than the predetermined corresponding values, respectively, and if the secondary near-distance error width and the secondary far-distance error width are equal to or less than the predetermined corresponding values, respectively, or (c) the target path is some other path than a straight path, a large curvature curved path and a constantly curved path if the conditions (a) and (b) are not satisfied.

3. The vehicle navigation control system as set forth in claim 2, wherein said steering angle formula selects one of (a) "steering angle $\delta$ = constant k1 × primary near-distance error width dL1" if the target path is a straight path or a curved path with a large curvature, (b) "steering angle $\delta$ = constant k3 × $\Sigma \epsilon L2$ secondary far-distance error width" if the target path is a constantly curved path, and (c) "steering angle $\delta$ = constant k2 × $\Sigma \epsilon L1$ secondary near-distance error width" if said target path is other than (a) and (b).

4. The vehicle navigation control system as set forth in claim 1, wherein said distance calculating means calculates a predetermined near-distance observing location, a predetermined far-distance location, and the target path in accordance with the image signal received from said cameras fixed to the vehicle.

5. The vehicle navigation control system as set forth in claim 1, further comprising switching means for selecting one proportional constant out of a plurality of proportional constants for use by said steering angle determining means, and said one proportional constant corresponding to the desired model steering angle formula selected by said steering angle formula selecting means.

6. The vehicle navigation control system as set forth in claim 1, further comprising:

said steering controller for receiving a steering angle signal from said steering angle determining means.

* * * * *